June 20, 1961     K. J. GERMESHAUSEN     2,989,727
ILLUMINATION LANDING METHOD AND SYSTEM
Filed Nov. 10. 1955     2 Sheets-Sheet 2

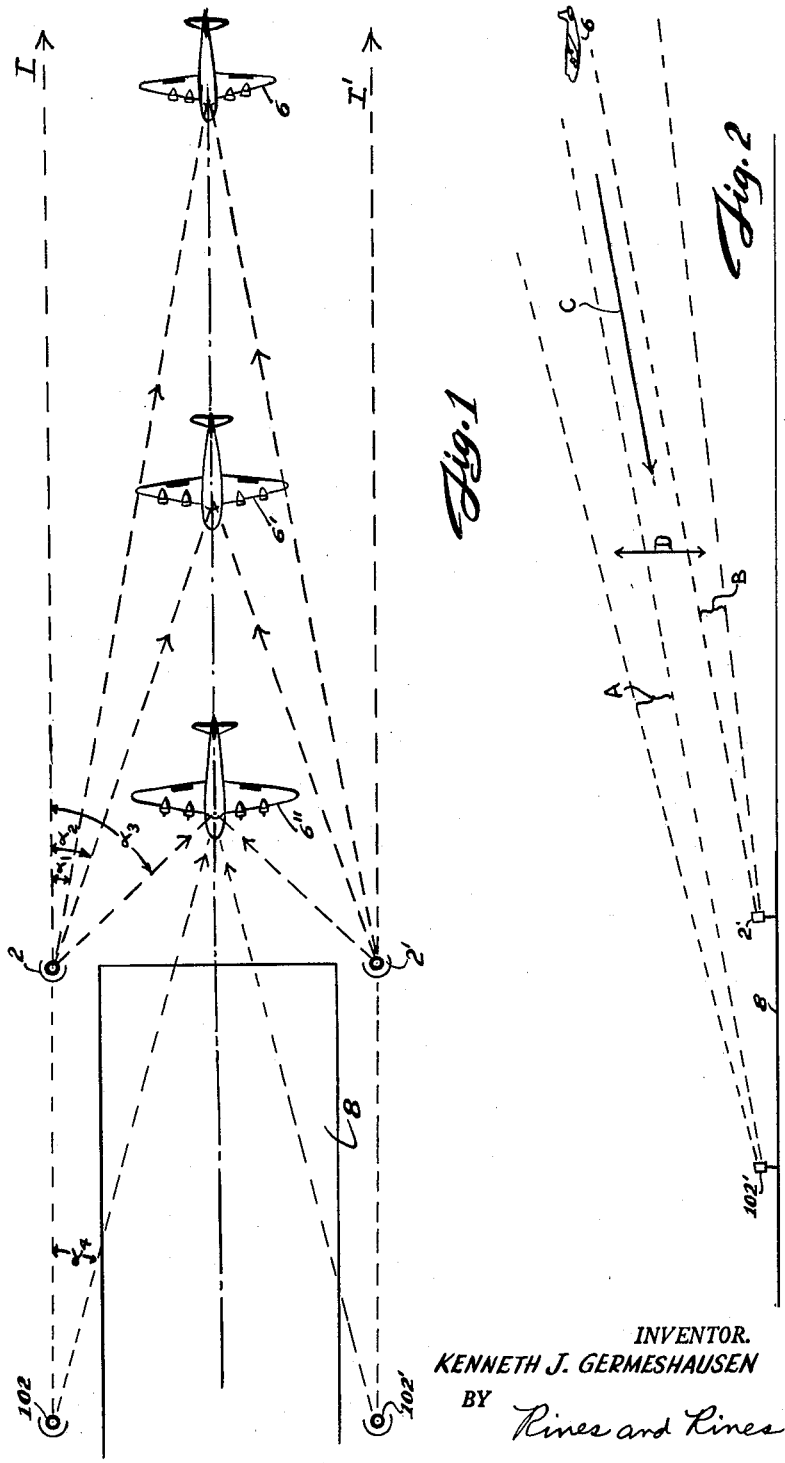

INVENTOR.
KENNETH J. GERMESHAUSEN
BY Rines and Rines
ATTORNEYS

United States Patent Office 2,989,727
Patented June 20, 1961

2,989,727
ILLUMINATION LANDING METHOD AND SYSTEM
Kenneth J. Germeshausen, Newton Center, Mass., assignor to Edgerton, Germeshausen & Grier, Inc., Boston, Mass., a corporation of Massachusetts
Filed Nov. 10, 1955, Ser. No. 546,135
29 Claims. (Cl. 340—26)

The present invention relates to methods of and systems for permitting the safe landing of aircraft and the like with the aid of sources of light waves.

The problems attendant upon the landing of aircraft at airfields has received continued attention since the aircraft became an accepted vehicle of transportation. Literally hundreds of schemes have been proposed for assisting the pilot in landing the aircraft, particularly in bad weather. At the present time, radio glide paths are employed as are ground-control-approach radar landing systems. These systems have the advantage that, particularly in hazy weather, their operation can continue unimpaired since radio waves penetrate haze and other deleterious weather conditions. The radio glide-path systems, however, do not have a very high degree of accuracy and, from the practical view, require some visual contact on the part of the pilot; whereas the ground-control-approach radar systems require expensive equipment on the ground and the transmission of continuous directions to the pilot by way of radio-communication equipment at the ground radar station. While such radio landing systems are useful where they can be afforded, in terms of space, cost and personnel, they still do not provide the desirable end of permitting the pilot to control the landing all by himself. They are certainly not adapted for small landing fields and the like for reasons of economy and for other reasons.

Many attempts have therefore been directed throughout the years toward trying to provide light-wave illumination systems that would enable the pilot visually to effect the landing of the aircraft at the landing field under adverse weather conditions. Unfortunately, however, none of these proposals has solved the complete problem, though various phases of the problem have been successfully solved. Many prior-art airport landing systems utilize conventional search lights, the beams of which permit the pilot to identify the airport at a distance, but, as a result of their high-intensity wide-angle illumination, blind the pilot if they are kept on during the landing operation. As a further illustration, light-wave beacons have been provided that enable the pilot to locate the field at great distances, such as, for example, flash beacons of the type disclosed in U.S. Letters Patent 2,331,771, issued to Kenneth J. Germeshausen and Herbert E. Grier on October 12, 1943, and rotating flash-producing beacon system of the type disclosed in U.S. Letters Patent 2,449,063 and 2,478,908 issued to Harold E. Edgerton on September 14, 1948 and August 16, 1949, respectively. Similar flashing-illumination sources have also been arranged to outline runways. The particular systems disclosed in these Letters Patent, however, while permitting the pilot to find the airport, also do not solve the complete problem of permitting the pilot to effect a landing on the landing strip of the airport. The flashing light sources, indeed, are also blinding to the pilot close to the airport.

An object of the present invention, accordingly, is to provide a new and improved system for illuminating aircraft landing strips and the like that shall not be subject to the above-described disadvantages, but, on the contrary, shall permit the pilot to effect a landing by continual visual contact with the sources of illumination at the landing field.

A further object is to accomplish this result without blinding the pilot as he nears the airport and approaches the runway. In accordance with the present invention, this result is achieved through the use of light sources, such as searchlights, beacons or illuminators, that have sufficient light intensity to permit their identification at large distances, but are particularly designed and positioned so that, as the pilot approaches the runway, they do not beam energy toward the pilot, but rather, to the side of the pilot, thus preventing blinding effects during landing.

An additional object is to provide a new and improved flash illuminator that is particularly adapted for use in these landing systems.

Other and further objects will be explained hereinafter and will be more particularly pointed out in connection with the appended claims.

The invention will now be described in connection with the accompanying drawings, FIG. 1 of which is a plan view of an aircraft landing strip equipped with illumination devices designed in accordance with the present invention;

FIG. 2 is a side elevation of the same, but upon a somewhat reduced scale.

Figure 3:
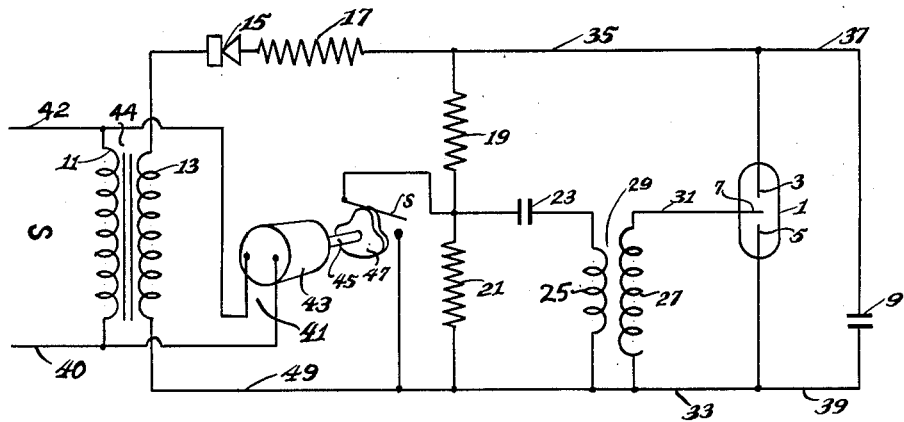
FIG. 3 is a circuit diagram of a preferred flash-producing circuit for use as the flash-illuminator.

On opposite sides of an aircraft runway or landing strip 8, there may be provided a forward pair of light sources 2 and 2', such as searchlights or beacon illuminators, and a rearward pair, 102, 102'. Three successive positions of an aircraft approaching the runway 8 are shown at 6, 6' and 6''. If the searchlights or beacons 2, 2', 102, 102', were of the conventional type having appreciable half-power beam widths, say of the order of forty-five degrees, more or less, they would produce sufficiently high-intensity illumination to permit of observation by the pilot in the aircraft 6, when at a considerable distance from the airport. When the aircraft approaches the positions illustrated in FIG. 1, however, the pilot would necessarily become blinded by this strong wide-angle illumination. This is because as the aircraft assumes the successively closer positions 6, 6' and 6'', the apparent brightness of the light radiated inward toward the pilot along the successive directions making the angles $\alpha_1$, $\alpha_2$, $\alpha_3$, etc. with the forward or principal axes I, I', successively increases. It would therefore ordinarily be necessary to turn off the searchlights 2, 2', 102, 102', or otherwise very markedly reduce their intensity, as the pilot aproaches the landing strip 8. This is not practical, however, for several reasons including the fact that at a busy airport, numerous aircraft are taking off and landing.

In accordance with the present invention, however, the beams of light transmitted by the devices 2, 2', 102 and 102' are so shaped that, though the illumination is of extremely high substantially maximum intensity along their forward or principal axes I, I', the beams do not radiate appreciable illumination inward along the directions making the angles $\alpha_1$, $\alpha_2$, $\alpha_3$, $\alpha_4$, etc. with the axes, thereby preventing blinding of the pilot.

From theoretical considerations, it would appear that such a result is attainable with a distribution of light intensity with angle off the principal axis such that the light flux radiated per unit solid angle varies as the inverse square of the sine of the angle off the principal axis. In actual practice, however, this precise relation is not required to the attainment of satisfactory results. It has been discovered that when one utilizes a small light source at the focus of a parabolic or spherical light reflector of such dimensions that the horizontal beam width of the transmitted light beam formed by the reflector is very small, preferably within the range of about 3 to about 5 degrees, at half-power points, and when such a source of illumination is oriented with its principal radiation axis substantially parallel to but slightly spaced from the side or edge of a runway so that the beam overlies the runway in part, such as substantially half of the beam, the pilot, in an approaching aircraft, receives from that light source substantially the same intensity of light irrespective of the distance of the aircraft from the light source. This has been found to produce a close enough approximation to the theoretical conditions for satisfactory operation. The radiation distribution of the sources is found to be then so confined or shaped that the beam candle power of the light flux per unit solid angle off the axes I, I', along the successively larger angles $\alpha_1$, $\alpha_2$, $\alpha_3$, etc., corresponding to the successively closer positions 6, 6', 6'', etc. of the aircraft from the landing strip 8, successively decreases by amounts sufficient to render the apparent brightness to the pilot substantially uniform or constant. Such a shaping of the beams will have the effect that, while the pilot will see the beams as a single light source at a great distance from the runway 8, as he approaches the runway and the angle $\alpha$ becomes successively larger, the amount of energy radiated inward toward the aircraft from the sources 2, 2', 102, 102', will become successively decreased and the sources 2 and 2' and 102 and 102' will gradually appear to divide into separate beams, none of which is pointed directly at the pilot, but the side illumination of which is sufficient to permit the pilot to observe the runway 8 without being blinded. The pilot can orient himself horizontally by observing which of the beams I or I' appears the brighter, and directing the aircraft so that the beams appear of substantially equal intensity. The axes I and I' are preferably directed along paths extending upward at a slight incline to the plane of the runway 8 so as to direct the beams above the ground, though at the greater distances from the end of the runway the beams appear as substantially parallel thereto.

While only one pair of sources 2, 2', is required near the end of the runway to orient or guide the pilot horizontally or laterally with respect to the runway 8, and, indeed, one source alone may be of utility in some cases, it is preferable to employ the additional pair of sources 102, 102', as described, oriented to provide a vertical guidance as well by a glide path C between the vertical beam patterns A and B, FIG. 2. The sources 102, 102', should be placed sufficiently rearward of the sources 2, 2' to provide a vertical beam separation D that provides enough room for the pilot to orient the aircraft vertically within the glide path so that the rearward and forward beams A and B appear to be of substantially equal intensity. In practice, a separation D of the order of from one to two hundred feet, more or less, has been found to be quite satisfactory. The separation D is then of the same order of magnitude as the width of the conventional landing strip 8. If the vertical half-power beam width of the sources is of the order of the 3 to 5 degrees before mentioned in connection with the horizontal beam width, the same results of separation of the beams during approach, without blinding, will be achieved along the vertical path C. This path C may be oriented at an angle of about 3 degrees with respect to the runway 8 for certain conventional runways, but the angle will vary in accordance with the specific approach angle of the various runway installations.

If the light sources are of the preferable hereinafter-described flash-tube types, the pairs of sources are preferably synchronously flashed. This end is described, for illustrative purposes, as effected with the aid of synchronous switch-controlling cams, later discussed in connection with FIG. 3, though electrical and electronic trigger synchronization could also be employed. From extensive flight tests, it has been determined that the invention is most useful if the beam-shaping and beam-positioning is such that the light-intensity level changes by at least a minimum of 1,000-to-one from a point three-quarters of a mile from the runway 8, to the runway. The apparatus herein described accomplishes this end.

Figure 4:
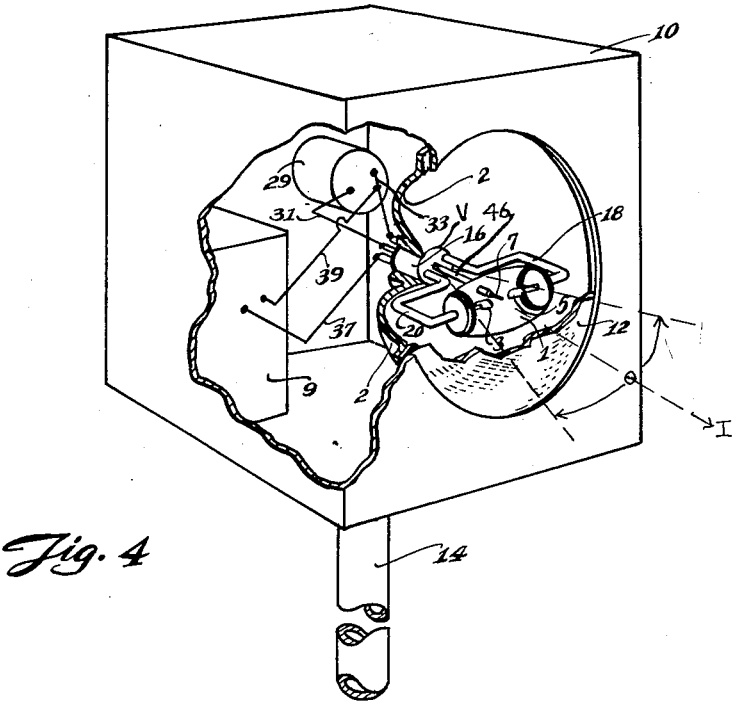
FIG. 4 is a perspective view, partly cut away, of a preferred mounting of the apparatus of FIG. 3 that is to be used in the system illustrated in FIGS. 1 and 2.

As a practical illustration, the light source 2 may comprise a concave reflector as of parabolic or spherical shape and the like, having a very small lamp 1, FIG. 4, at its focus. The lamp 1 is preferably of the repetitive flash-producing type, in order to achieve not only improved efficiency and high intensity along the beam axis with the necessary small dimensions, but to enable the pilot more readily to pick up the flashing beam. In addition, it has been experimentally discovered that, for a given ability to detect a light source, a flashing source is less blinding than an equivalent continuous source. The flash-lamp or flash-tube 1 may have a discharge path only ¼-inch in length in order to produce, with reflectors of reasonable dimensions, such as a foot, more or less, having a relatively small focal length, say of the order of three inches, more or less, the necessary beam-shaping and narrow half-power beam angle. The angle $\theta$ subtended from the vertex V of the parabolic reflector 2 by the flash-lamp 1, FIG. 4, corresponds approximately to the half-power beam width produced by the source 1, thus demonstrating the necessity for such a small light source to achieve the necessary approximately 3-to-5 degree half-power beam width angle. Conventional flash tubes, such as those disclosed in the said Letters Patent, therefore, are too large to be utilized as light sources in accordance with the present invention.

Since the flash-lamp 1 must be of such small size, it is necessary that it be provided with an extremely short discharge-gap between its principal electrodes 3 and 5 and that the lamp contain gas at high pressure, in order to achieve the result of producing high intensity illumination along the principal radiation axis. The flash-lamp 1 is preferably provided with an internal trigger electrode 7 disposed between the electrodes 3 and 5. In case of the ¼-inch tube, before mentioned, the electrodes 3 and 5 may be about an eighth of an inch in cross section and the tube may be filled with xenon gas operated at high pressures of the order of from about ½ to about 2 atmospheres of pressure. The flash-lamp 1 may be flashed by any desired flash circuit, such as, for example, those disclosed in the said Letters Patent. A preferred circuit is shown in FIG. 3, operable from the ordinary A.-C. mains 40, 42. The mains 40, 42, may energize the primary winding 11 of a power transformer 44. The secondary winding 13 of the transformer 44 provides energy that, after rectification by a rectifier 15, is utilized to charge one or more flash capacitors or condensers 9. The charging circuit is traceable from the upper terminal of the secondary winding 13, through the rectifier 15 and a current-limiting impedance 17, and by way of conductors 35 and 37 to the upper terminal of the capacitor or condenser 9; thence, from the lower terminal of the capacitor or condenser 9, by way of the conductors 39, 33 and 49 to the lower terminal of the secondary winding 13. The secondary winding 13 may have a sufficient turns ratio with respect to the primary winding 11 to supply a voltage of, for example, about 2,000 volts. The capacitor 9 may then have a value of about 10 microfarads. This 2,000-volt voltage is not sufficient, however, to produce a discharge between the electrodes 3 and 5 in the high-pressure flash-tube 1 in the absence of energization of the trigger electrode 7. The trigger electrode 7 may be periodically energized by a trigger circuit in order periodically to permit the charging of the capacitor 9 and its discharging through the flash-tube 1 between the electrodes 3 and 5. The trigger circuit comprises a trigger transformer 29 the secondary winding 27 of which is connected by a conductor 31 to the trigger electrode 7 and by the conductor 33 to, for example, the lower or cathode electrode 5 of the flash-tube 1. The primary winding 25 of the trigger transformer 29 is energized by successive impulses resulting from the periodic discharge therethrough of a further condenser or capacitor 23. The capacitor 23 is normally charged from the bleeder network 19, 21 connected between the conductors 35 and 49, and it periodically discharges upon the periodic closure of a switch S in response to the rotation of a cam 47. The cam 47 is, in turn, driven by a shaft 45 from a motor 43 that may be energized by conductors 41 from the mains 40, 42. When the switch S is closed, the condenser 23 discharges therethrough and through the primary winding 25 of the trigger transformer 29, to produce a trigger impulse that is stepped-up in the secondary winding 27 and applied to the trigger electrode 7, thereby to discharge the energy stored by the capacitor 9 between the anode electrode 3 and the cathode electrode 5 of the flash-tube 1. A flash of high-intensity light is thus produced. Successive rotations of the cam 47 will accordingly produce successive flashes of light in the flash-tube 1. Each of the light sources may easily be synchronously flashed through the synchronizing of the cams 47 of each flash unit. By operating the motor 43 at one revolution per second, as an illustration, flashes of illumination occurring once per second and having an energy per flash of substantially 20 watt-seconds may be attained with the apparatus above-described. The integrated light produced per flash in such a system has been found to be of the order of about 36,000 beam-candle-power-seconds along the principal axis I of the source. A typical gain produced by the parabolic reflector 2 along the axis I is of the order of about 1500.

The circuit of FIG. 3 may be conveniently housed, as shown in FIG. 4, for positioning along the edge or side of the runway 8. Specifically, the reflector 2 with its flash-lamp 1 may be mounted behind a glass or other transparent window 12 in the front wall of a housing 10. The flash-lamp 1 may be supported at the focus of the reflector 2 by tubular supports 18 and 20 that may pass through a mounting plug 16 at the vertex V of the reflector 2. The flash-tube 1 is shown preferably horizontally oriented with the center of the tube, corresponding to the position of the trigger electrode 7, at substantially the focus of the reflector 2. The principal reason for this horizontal orientation resides in the fact that the error in detecting horizontal position during a landing approach has been found to be greater than the vertical error. It is therefore preferable that the horizontal beam width of the light sources be somewhat greater, preferably just slightly larger, than the vertical beam width. Since, as before stated, the angle θ subtended by the tube is related to the beam width, the larger dimension of the flash tube, corresponding to the length of the column of illumination produced thereby, should be oriented horizontally to obtain a greater horizontal beam angle. The tubular supports 18 and 20 may carry within them the electrical conductors 37 and 39 that connect to the capacitor or capacitors 9, also disposed within the housing 10. The trigger electrode 7 may similarly be connected by conductor 31, passed through a tubular support 46, to the trigger transformer 29. The location of other parts is not illustrated in order to avoid confusion, it being understood that the other components may be assembled in any desired manner. The housing 10 may be adjustable vertically and angularly with respect to a stand 14, as is well known.

If the important advantages of the most satisfactory beam-shaping consistent with high maximum light intensity along the beam axis and the most discernable beam-finding are not desired, other types of lamps or arcs may be employed. The invention, moreover, not only provides a new method of using light-beam sources that gives rise to new results, but it is clearly capable of practice with a wide variety of different types of light-producing apparatus, as above indicated.

Further modifications will accordingly occur to those skilled in the art and all such are considered to fall within the spirit and scope of the present invention as defined in the appended claims.

What is claimed is:

1. Apparatus of the character described that comprises means for transmitting light waves in successive synchronized flashes from first and second pairs of points spaced from one another along a runway and the like, with the points of each pair of points disposed on opposite sides of the runway and the like, means for confining the transmitted waves at each point to a beam having an axis of maximum light intensity along a predetermined path of substantially the same direction as the runway and the like but oriented at a slight incline thereto and having horizontal and vertical half-power beam widths of the order of a few degrees, means for directing each beam axis so that only part of the few-degree beam overlies the runway and the like, and means for adjusting the spacing between the first and second pairs of points along the runway and the like to separate the inclined beams transmitted from the first and second pairs of points vertically sufficiently to provide an adequate inclined glide path therebetween.

2. A system for permitting visual approach to a runway and the like having, in combination, a light source, means for confining the light waves transmitted by the source to a beam having an axis of maximum light intensity and a half-power beam width of the order of a few degrees, and means for disposing the light source and the confining means at the side of the runway and the like with the said beam axis oriented in substantially the same direction as the runway and the like and with part only of the beam overlying the runway and the like.

3. A system for permitting visual approach to a runway and the like having, in combination, a light source, means for confining the light waves transmitted by the source to a beam having an axis of maximum light intensity and a half-power beam width of the order of a few degrees, and means for disposing the light source and the confining means at the side of the runway and the like with the said beam axis oriented in substantially the same direction as the runway and the like but at a slight incline thereto and with part only of the beam overlying the runway and the like.

4. A system for permitting visual approach to a runway and the like having, in combination, a light source, means for confining the light waves transmitted by the source to a beam having an axis of maximum light intensity and a half-power beam width of the order of a few degrees, means for disposing the light source and the confining means at the side of the runway and the like with the said beam axis oriented in substantially the same direction as the runway and the like and with part only of the beam overlying the runway and the like, and means for periodically flashing the light source.

5. Apparatus as claimed in claim 4 and in which the light source is a high-pressure gas-filled flash-tube having a pair of closely spaced principal electrodes and the confining means is a substantially concave reflector at the focus of which the flash-tube is mounted.

6. Apparatus as claimed in claim 5 and in which the space between the said electrodes is of the order of a quarter of an inch and the gas pressure is of the order of from substantially one-half atmosphere to substantially two atmospheres.

7. Apparatus as claimed in claim 5 and in which the flash-tube is mounted with the principal electrodes extending substantially horizontally and with the said focus therebetween.

8. Apparatus as claimed in claim 5 and in which the flash-tube is also provided with a trigger electrode and the flashing means comprises a main flash-capacitor circuit connected between the said principal electrodes and a periodically operated trigger circuit for periodically energizing the trigger electrode in order periodically to discharge the flash-capacitor circuit between the said principal electrodes in order to produce periodic flashes of light.

9. Apparatus as claimed in claim 5 and in which the tube is of length greater than its width and is mounted with the length disposed substantially horizontally.

10. Apparatus as claimed in claim 4 and in which the flashing means comprises a rotatable cam-operated switching circuit.

11. A system for permitting visual approach to a runway and the like having, in combination, a pair of similar light sources, a pair of similar means for confining the light waves transmitted by the corresponding pair of light sources to similar beams each having an axis of maximum light intensity and a half-power beam width of the order of a few degrees, and means for disposing each of the light sources with its corresponding confining means on opposite sides of the runway and the like with its said beam axis oriented in substantially the same direction as the runway and the like and with part only of each beam overlying the runway and the like.

12. A system for permitting visual approach to a runway and the like having, in combination, a pair of similar light sources, a pair of similar means for confining the light waves transmitted by the corresponding pair of light sources to similar beams each having an axis of maximum light intensity and a half-power beam width of the order of a few degrees, and means for disposing each of the light sources with its corresponding confining means on opposite sides of the runway and the like with its said beam axis oriented in substantially the same direction as the runway and the like but at a slight incline thereto and with part only of each beam overlying the runway and the like.

13. A system for permitting visual approach to a runway and the like having, in combination, a pair of similar light sources, a pair of similar means for confining the light waves transmitted by the corresponding pair of light sources to similar beams each having an axis of maximum light intensity and a half-power beam width of the order of a few degrees, means for disposing each of the light sources with its corresponding confining means on opposite sides of the runway and the like with its said beam axis oriented in substantially the same direction as the runway and the like and with part only of each beam overlying the runway and the like, and means for periodically synchronously flashing the pair of light sources.

14. A system for permitting visual approach to a runway and the like having, in combination, two pairs of similar light sources, two pairs of similar means for confining the light waves transmitted by the corresponding two pairs of light sources to similar beams each having an axis of maximum light intensity and a half-power beam width of the order of a few degrees, one of the pairs of similar light sources being spaced along the runway and the like from the other pair, and means for disposing the light sources of each pair with its corresponding confining means on opposite sides of the runway and the like with its said beam axis oriented in substantially the same direction as the runway and the like but at a slight incline thereto and with part only of each beam overlying the runway and the like, the spacing along the runway and the like between the pairs of light sources being adjusted to separate the inclined beams transmitted by the pairs of light sources vertically sufficiently to provide an adequate inclined glide path therebetween.

15. A system for permitting visual approach to a runway and the like having, in combination, two pairs of similar light sources, two pairs of similar means for confining the light waves transmitted by the corresponding two pairs of light sources to similar beams each having an axis of maximum light intensity and a half-power beam width of the order of a few degrees, one of the pairs of similar light sources being spaced along the runway and the like from the other pair, means for disposing the light sources of each pair with its corresponding confining means on opposite sides of the runway and the like with its said beam axis oriented in substantially the same direction as the runway and the like but at a slight incline thereto and with part only of each beam overlying the runway and the like, and means for periodically synchronously flashing the pairs of light sources, the spacing along the runway and the like between the pairs of light sources being adjusted to separate the inclined beams transmitted by the pairs of light sources vertically sufficiently to provide an adequate inclined glide path therebetween.

16. A system for permitting visual approach to a runway and the like having, in combination, a light source, means for confining the light waves transmitted by the source to a beam having an axis of maximum light intensity and rapidly decreasing light intensity at successively larger angles off the axis sufficient to provide substantially uniform apparent brightness as the runway and the like is approached, and means for disposing the light source and the confining means at the side of the runway and the like with the said beam axis oriented in substantially the same direction as the runway and the like and with part only of the beam overlying the runway and the like.

17. A system for permitting visual approach to a runway and the like having, in combination, a light source, means for confining the light waves transmitted by the source to a beam having an axis of maximum light intensity and rapidly decreasing light intensity at successively larger angles off the axis sufficient to provide a light-intensity level change of at least substantially one thousand-to-one from a point substantially three quarters of a mile from the runway and the like to the end thereof, and means for disposing the light source and the confining means at the side of the runway and the like with the said beam axis oriented in substantially the same direction as the runway and the like and with part only of the beam overlying the runway and the like.

18. A system for permitting visual approach to a runway and the like having, in combination, a light source, means for confining the light waves transmitted by the source to a beam having an axis of maximum light intensity and a rapidly decreasing light candle power varying substantially as the sine-squared of the angle off the axis, and means for disposing the light source and the confining means at the side of the runway and the like with the said beam axis oriented in substantially the same direction as the runway and the like and with part only of the beam overlying the runway and the like.

19. A system for permitting visual approach to a runway and the like having, in combination, a light source, means for confining the light waves transmitted by the source to a beam having an axis of maximum light intensity and a half-power beam width of the order of a few degrees, and means for disposing the light source and the confining means at the side of the runway and the like with the said beam axis oriented in substantially the same direction as the runway and the like and with part only of the beam overlying the runway and the like, the horizontal angle subtended by the beam being slightly larger than the vertical beam angle.

20. A lamp arrangement for permitting visual approach to a runway and the like comprising a gaseous-discharge flash device having a pair of closely spaced principal electrodes in the path between which a discharge may be produced to generate a flash of illumination, a substantially concave reflector of cross dimension large compared with the dimension of the said discharge path and having a focal region, and means for mounting the tube with the said discharge path disposed near the said focal region and oriented substantially horizontally in a plane at substantially right angles to the axis of the reflector and with part only of the beam overlying the runway and the like.

21. A lamp arrangement as claimed in claim 20 and in which there is provided trigger electrode means disposed within the said discharge path for initiating the discharge therealong in the substantially horizontal direction.

22. A lamp arrangement for permitting visual approach to a runway and the like comprising a gaseous-discharge flash device having a pair of closely spaced principal electrodes in the path between which a discharge may be produced to generate a flash of illumination, a substantially concave reflector of cross dimension large compared with the dimension of the said discharge path and having a focal region, means for mounting the tube with the said discharge path disposed near the said focal region and oriented substantially horizontally in a plane at substantially right angles to the axis of the reflector, and means for mounting the flash device and reflector lamp arrangement at the side of the runway and the like with the direction of the said axis of the reflector oriented in substantially the same direction as the said side of the runway and the like and with part only of the reflected illumination overlying the runway and the like.

23. A lamp arrangement for permitting visual approach to a runway and the like comprising a gaseous-discharge flash device having a pair of closely spaced principal electrodes in the path between which a discharge may be produced to generate a flash of illumination, a substantially concave reflector of cross dimension large compared with the dimension of the said discharge path and having a focal region, means for mounting the tube with the said discharge path disposed near the said focal region and oriented substantially horizontally in a plane at substantially right angles to the axis of the reflector, and means for mounting the flash device and reflector lamp arrangement at the side of the runway and the like with the direction of the said axis of the reflector oriented in substantially the same direction as the said side of the runway and the like, and means for periodically discharging the flash device and with part only of the beam overlying the runway and the like.

24. A lamp arrangement for permitting visual approach to a runway and the like comprising a gaseous-discharge flash device having a pair of closely spaced principal electrodes in the path between which a discharge may be produced to generate a flash of illumination, a substantially concave reflector of cross dimension large compared with the dimension of the said discharge path and having a focal region, means for mounting the tube with the said discharge path disposed near the said focal region and oriented substantially horizontally in a plane at substantially right angles to the axis of the reflector, and means for mounting the flash device and reflector lamp arrangement at the side of the runway and the like with the direction of the said axis of the reflector oriented in substantially the same direction as the said side of the runway and the like, but at a slight incline thereto in a plane containing the said axis and the said side of the runway and the like and with part only of the beam overlying the runway and the like.

25. A lamp arrangement for permitting visual approach to a runway and the like comprising means for producing a short column of illumination longer than it is wide, an illumination-collimating device of cross dimension large compared with both the length and width of the column of illumination and having a focal region, and means for mounting the producing means with the said column of illumination disposed near the said focal region and oriented with the length of the column substantially horizontal in a plane at substantially right angles to the axis of the collimating device and with part only of the collimated illumination overlying the runway and the like.

26. A lamp arrangement for permitting visual approach to a runway and the like comprising means for producing a short column of illumination longer than it is wide, an illumination-collimating device of cross dimension large compared with both the length and width of the column of illumination and having a focal region, and means for mounting the producing means with the said column of illumination disposed near the said focal region and oriented with the length of the column substantially horizontal in a plane at substantially right angles to the axis of the collimating device, and means for mounting the column-producing means and the collimating device at the side of the runway and the like with the direction of the said axis of the reflector oriented in substantially the same direction as the said side of the runway and the like and with part only of the collimated illumination overlying the runway and the like.

27. A lamp arrangement for permitting visual approach to a runway and the like comprising means for producing a short column of illumination longer than it is wide, an illumination-collimating device of cross dimension large compared with both the length and width of the column of illumination and having a focal region, and means for mounting the producing means with the said column of illumination disposed near the said focal region and oriented with the length of the column substantially horizontal in a plane at substantially right angles to the axis of the collimating device, and means for mounting the column-producing means and the collimating device at the side of the runway and the like with the direction of the said axis of the reflector oriented in substantially the same direction as the said side of the runway and the like, but at a slight incline thereto in a plane containing the said axis and the said side of the runway and the like and with part only of the collimated illumination overlying the runway and the like.

28. A system for permitting visual approach to a runway and the like having, in combination, a light source, means sufficiently large compared with the dimensions of the source for confining the light waves transmitted by the source to a beam having an axis of maximum light intensity and a half-power beam width of the order of a few degrees, means for disposing the light source and the confining means at the side of the runway and the like, and means for orienting the said beam axis in substantially the same direction as the said side of the runway and the like, with only substantially one-half of the few-degree beam overlying the runway and the like, thereby to produce a beam pattern that presents substantially constant apparent brightness at successive distances from the runway, thereby to transmit such substantially one-half of the few-degree beam along and over the runway.

29. A system as claimed in claim 28 and in which the said beam axis is slightly inclined in elevation with respect to and in a plane substantially parallel to the said side of the runway and the like.

References Cited in the file of this patent

UNITED STATES PATENTS

| | | |
|---|---|---|
| 1,384,659 | Benard | July 12, 1921 |
| 1,413,379 | Benard | Apr. 18, 1922 |
| 1,871,505 | Falge | Aug. 16, 1932 |
| 2,339,243 | Adler | Jan. 18, 1944 |
| 2,478,908 | Edgerton | Aug. 16, 1949 |
| 2,498,294 | Pennow | Feb. 21, 1950 |
| 2,597,321 | Hergenrother | May 20, 1952 |
| 2,669,703 | Hammond | Feb. 16, 1954 |
| 2,722,631 | Bowtell | Nov. 1, 1955 |
| 2,817,069 | Pennow | Dec. 17, 1957 |